(12) United States Patent
Thomas et al.

(10) Patent No.: US 11,375,662 B2
(45) Date of Patent: Jul. 5, 2022

(54) APPARATUS AND METHOD FOR MONITORING GRAIN CONTENT WITHIN A TAILINGS SYSTEM OF AN AGRICULTURAL HARVESTER

(71) Applicant: CNH Industrial America LLC, New Holland, PA (US)

(72) Inventors: Jeff Thomas, Gordonville, PA (US); Curtis Frederick Hillen, Lititz, PA (US); Joshua Mark Beichner, Shippenville, PA (US); Zachary Harmon, Robesonia, PA (US)

(73) Assignee: CNH Industrial America LLC, New Holland, PA (US)

( * ) Notice: Subject to any disclaimer, the term of this patent is extended or adjusted under 35 U.S.C. 154(b) by 459 days.

(21) Appl. No.: 16/439,004

(22) Filed: Jun. 12, 2019

(65) Prior Publication Data

US 2020/0390033 A1 Dec. 17, 2020

(51) Int. Cl.
*A01D 41/127* (2006.01)
*A01F 12/44* (2006.01)
*G01L 5/00* (2006.01)

(52) U.S. Cl.
CPC ........ *A01D 41/1276* (2013.01); *A01F 12/446* (2013.01); *G01L 5/0052* (2013.01)

(58) Field of Classification Search
CPC .............. A01D 41/1276; A01D 41/127; A01D 41/1278; A01D 41/1274; A01F 12/446; A01F 12/52; G01L 5/0052
See application file for complete search history.

(56) References Cited

U.S. PATENT DOCUMENTS

| | | | |
|---|---|---|---|
| 4,481,756 A | 11/1984 | Schartz | |
| 4,490,964 A | * 1/1985 | Eldredge | ............ A01D 41/1273 460/5 |
| 4,517,792 A | 5/1985 | Denning et al. | |
| 6,342,006 B1 | 1/2002 | Bauch et al. | |
| 7,584,663 B2 | 9/2009 | Missotten et al. | |
| 7,654,141 B2 | 2/2010 | Behnke et al. | |

(Continued)

FOREIGN PATENT DOCUMENTS

| | | | | |
|---|---|---|---|---|
| CA | 2217320 A1 | * 4/1998 | ............ | A01F 12/52 |
| CN | 203661659 U | * 6/2014 | ............ | A01F 12/32 |

(Continued)

OTHER PUBLICATIONS

PCT International Search Report and Written Opinion for PCT application PCT/US2020/037478, dated Sep. 18, 2020 (11 pages).

*Primary Examiner* — Arpad Fabian-Kovacs
(74) *Attorney, Agent, or Firm* — Peter Zacharias; Patrick Sheldrake

(57) ABSTRACT

A cleaning and tailings system of an agricultural harvester including an upper sieve and a lower sieve spaced from the upper sieve. A clean grain sheet is disposed below the lower sieve, and a tailings sheet is disposed below the clean grain sheet for receiving grain from the lower sieve and upper sieve. A tailings auger is disposed about a forward end of the tailings sheet, and a sensor is disposed about an inlet of the tailings auger for sensing impact of grain received by the tailings sheet. A controller is in communication with the sensor, wherein the controller is configured to determine an amount of grain received by the tailings sheet.

18 Claims, 8 Drawing Sheets

(56) References Cited

U.S. PATENT DOCUMENTS

| | | | |
|---|---|---|---|
| 7,713,115 B2 | 5/2010 | Behnke et al. | |
| 7,976,369 B2 | 7/2011 | Craessaerts et al. | |
| 8,282,453 B1 | 10/2012 | Hillen et al. | |
| 9,629,308 B2 | 4/2017 | Scholer et al. | |
| 9,775,290 B2 | 10/2017 | Schleusner et al. | |
| 9,807,932 B2 | 11/2017 | French, Jr. et al. | |
| 9,999,176 B2 | 6/2018 | Leenknegt et al. | |
| 10,058,029 B2 | 8/2018 | Bischoff | |
| 2003/0066277 A1* | 4/2003 | Behnke | A01D 41/127 56/10.2 R |
| 2005/0137003 A1* | 6/2005 | Behnke | A01D 41/1276 460/1 |
| 2005/0143153 A1* | 6/2005 | Behnke | A01D 41/1276 460/4 |
| 2005/0186997 A1 | 8/2005 | Ho et al. | |
| 2005/0208987 A1* | 9/2005 | Ho | A01D 41/127 460/1 |
| 2006/0272307 A1* | 12/2006 | Behnke | A01D 41/127 56/10.2 R |
| 2008/0318648 A1* | 12/2008 | Baumgarten | A01D 41/1273 460/5 |
| 2010/0217481 A1* | 8/2010 | Baumgarten | A01D 41/127 701/33.4 |
| 2014/0019018 A1* | 1/2014 | Baumgarten | A01D 41/127 701/50 |
| 2015/0046043 A1* | 2/2015 | Bollin | A01D 41/127 701/50 |
| 2015/0293507 A1* | 10/2015 | Burns | A01D 41/127 700/83 |
| 2016/0081271 A1* | 3/2016 | Mott | A01D 41/1276 701/50 |
| 2016/0235003 A1 | 8/2016 | Baumgarten et al. | |
| 2017/0235471 A1 | 8/2017 | Scholer et al. | |
| 2018/0049369 A1 | 2/2018 | Secrest et al. | |

FOREIGN PATENT DOCUMENTS

| | | | | |
|---|---|---|---|---|
| CN | 106508257 A | * | 3/2017 | ......... A01D 41/1278 |
| EP | 1516522 A2 | | 3/2005 | |
| EP | 2057880 A2 | | 5/2009 | |
| EP | 2510777 A1 | * | 10/2012 | ........... A01D 75/282 |
| EP | 2606712 A1 | | 6/2013 | |
| EP | 3238528 B1 | * | 8/2019 | ........... A01F 12/446 |
| EP | 3566564 A1 | * | 11/2019 | ......... A01D 41/127 |
| JP | 2004065247 A | * | 3/2004 | ............. A01F 12/32 |

* cited by examiner

APPARATUS AND METHOD FOR MONITORING GRAIN CONTENT WITHIN A TAILINGS SYSTEM OF AN AGRICULTURAL HARVESTER

The exemplary embodiments of subject disclosure relate generally to a plant harvesting machine (e.g., a combine harvester) and, more specifically, to apparatuses and methods for monitoring grain content within a tailings flow of a combine harvester.

BACKGROUND OF THE INVENTION

An agricultural harvester e.g., a plant harvesting machine, such as, but not limited to, a combine, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

From the feederhouse, the cut crop enters the crop processing area of the combine where it is threshed, separated and cleaned to separate grain from material other than grain (hereinafter "MOG"), whereby the grain is collected by the combine and the MOG discharged from the combine.

SUMMARY OF THE INVENTION

In accordance with an exemplary embodiment of the subject disclosure, there is provided a cleaning and tailings system of an agricultural harvester comprising an upper sieve and a lower sieve spaced from the upper sieve. A clean grain sheet is disposed below the lower sieve, and a tailings sheet is disposed below the clean grain sheet for receiving grain and MOG from the lower sieve and upper sieve. A tailings auger is disposed about a forward end of the tailings sheet, and a sensor is disposed about an inlet of the tailings auger for sensing impact of grain received by the tailings sheet.

In accordance with another exemplary embodiment there is provided an agricultural combine comprising the cleaning and tailings system described above, and a controller in communication with the sensor. The controller is configured to determine an amount of grain received by the tailings sheet.

In accordance with another exemplary embodiment there is provided a method for monitoring grain content within the tailings flow of the cleaning and tailings system of an agricultural harvester having an upper sieve and a lower sieve spaced from the upper sieve. The cleaning and tailings system further includes a clean grain sheet situated below the lower sieve and a tailings sheet situated below the clean grain sheet. A tailings auger is situated about a forward end of the tailings sheet. The method comprises the steps of disposing a sensor about an inlet to the tailings auger to sense impact of grain delivered from the tailings sheet, and using a controller in communication with the sensor, determining an amount of grain received by the tailings sheet.

In accordance with the exemplary embodiments of the subject disclosure, there is provided an apparatus and method for monitoring grain content within a tailings flow of a combine harvester which accurately determines an amount of grain received by the tailings sheet in real time by virtue of disposing a sensor about an inlet to the tailings auger to sense impact of grain received by the tailings sheet. By placing the sensor about an inlet of the tailings auger, an accurate determination of the amount of grain received by the tailings sheet is achieved.

Other features and advantages of the subject disclosure will be apparent from the following more detail description of the exemplary embodiments of the subject disclosure.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
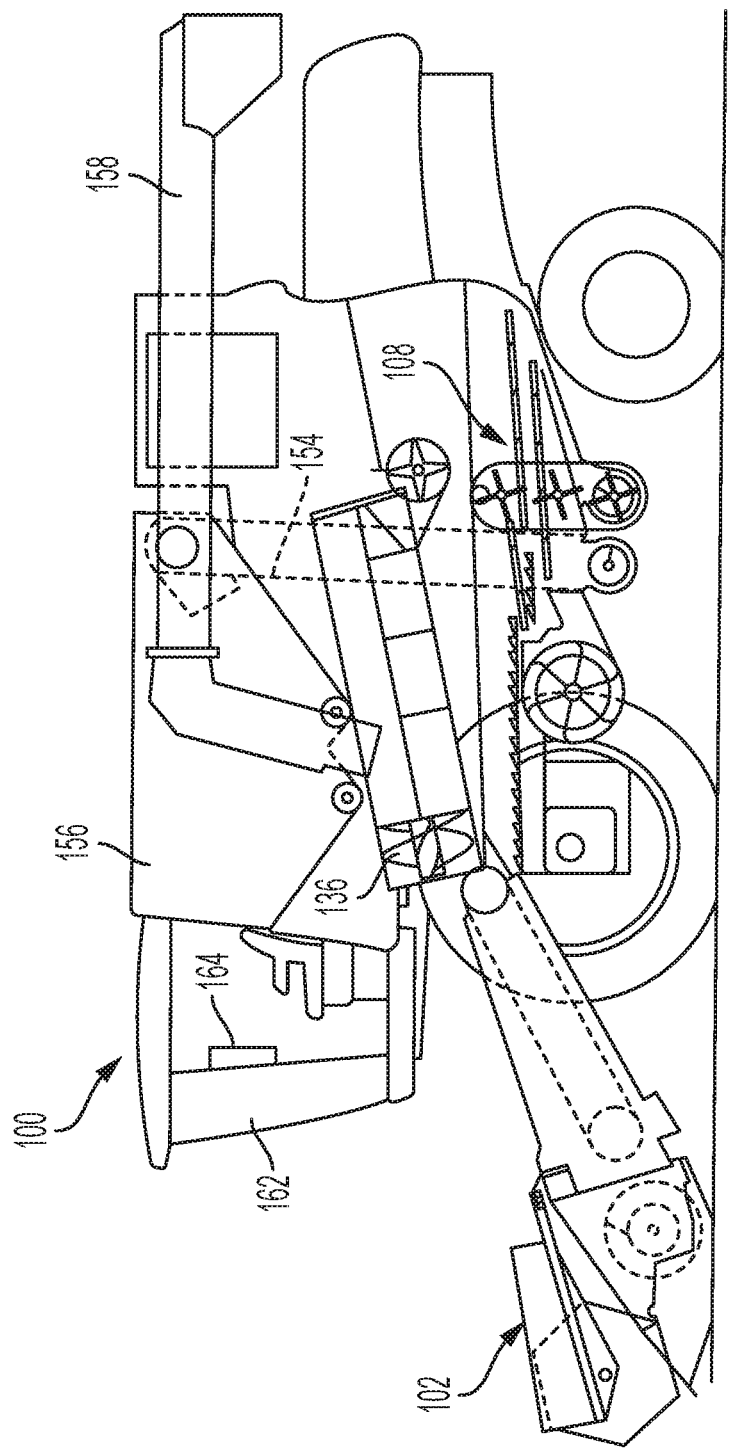
FIG. 1 is a side elevation view of an agricultural harvester including a cleaning and tailings system in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The agricultural harvester of the subject application is applicable to a variety of crops, including but not limited to wheat, soybeans and small grains. The terms "debris," "MOG," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. Agricultural harvesters including a cleaning and tailings system are known. For example, an agricultural harvester including a cleaning and tailings system is disclosed in U.S. Pat. No. 9,999,176, which is incorporated herein by reference in its entirety for all purposes. The harvester 100 according to the exemplary embodiment includes a header 102 attached to a forward end of the harvester 100, which is configured to cut crops, including (without limitation) small grains (e.g., wheat, soybeans, grain, etc.), and to induct the cut crops into a feederhouse as the harvester moves forward over a crop field. The harvester 100 further includes a threshing system including a threshing rotor 136 and a cleaning and tailings system 108 which separates grain from MOG in the manner described below.

Figure 2:
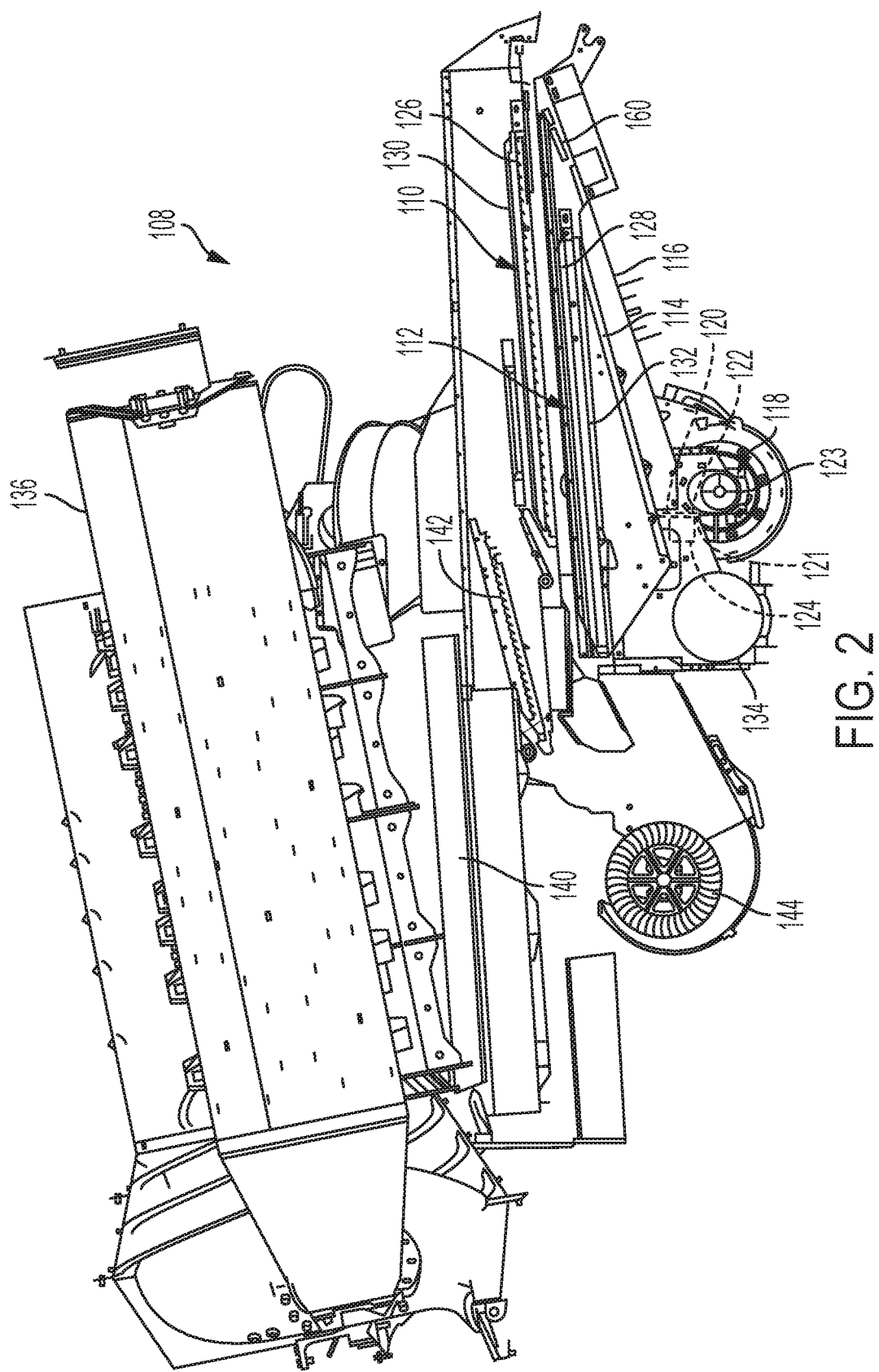
FIG. 2 is a side elevation view of a cleaning and tailings system in accordance with the subject disclosure suitable for use with the agricultural harvester of FIG. 1.
Figure 3:
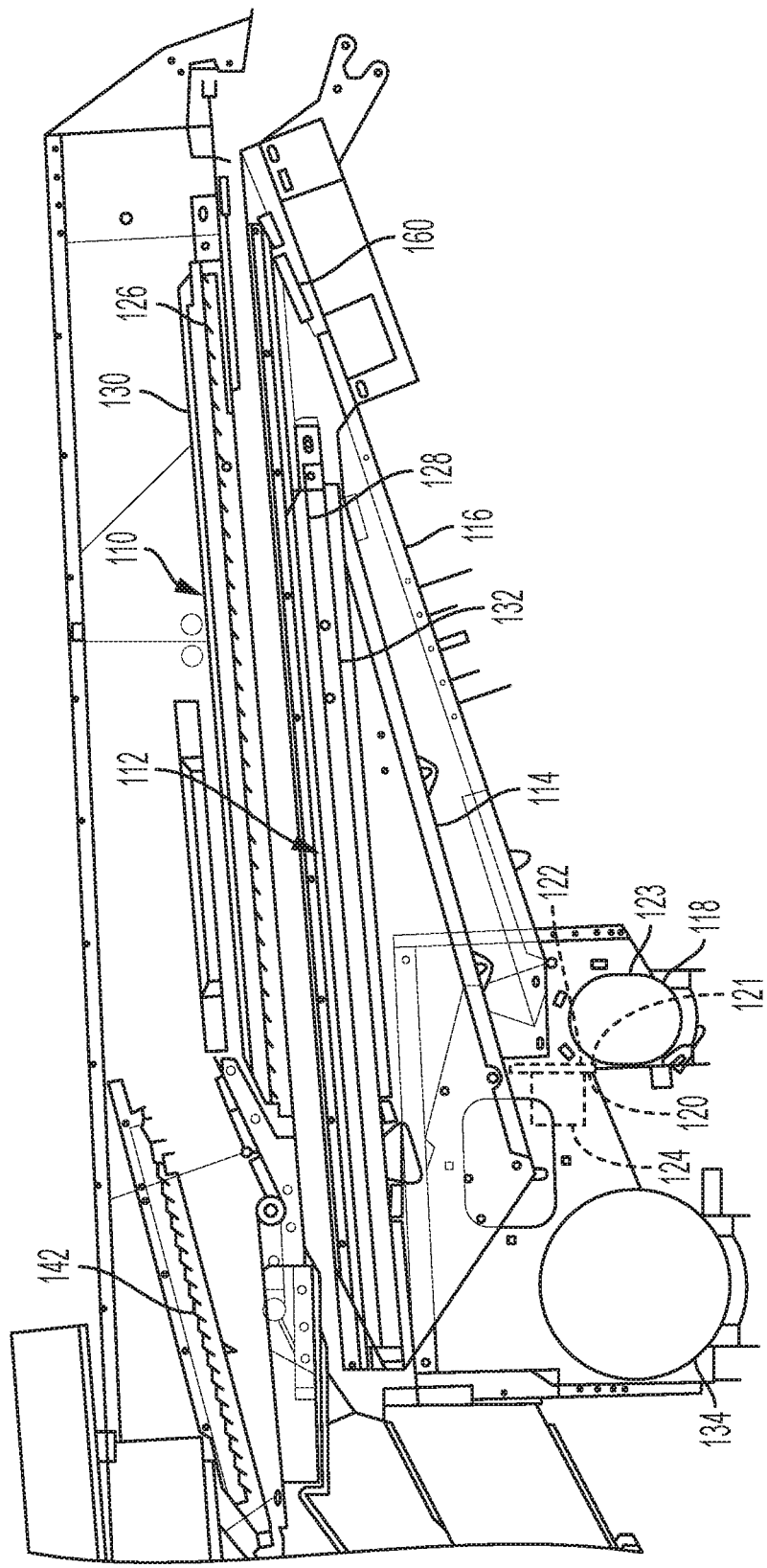
FIG. 3 is an enlarged side elevation view of the cleaning and tailings system of FIG. 2.
Figure 4:
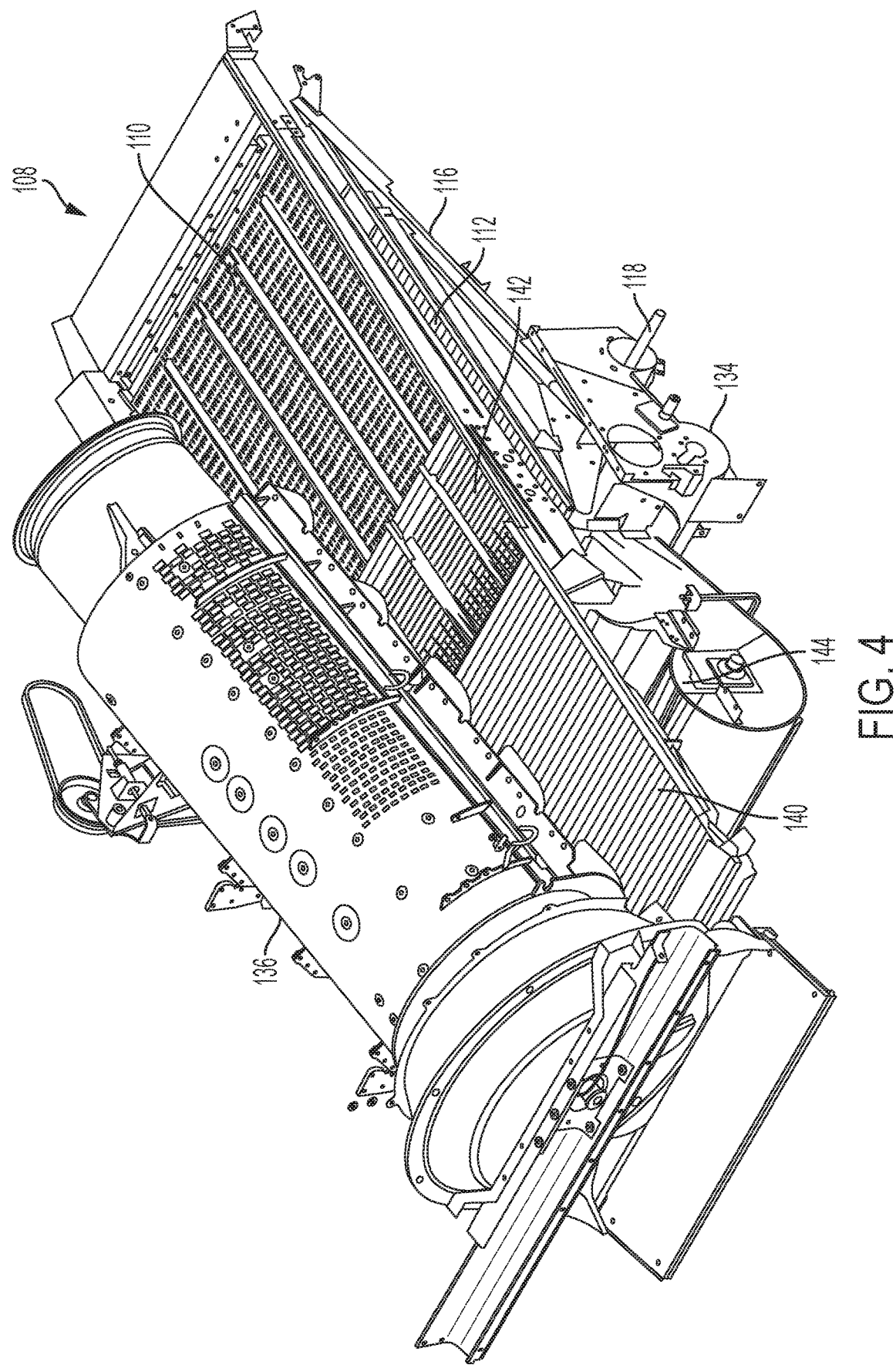
FIG. 4 is a top perspective view of one side of the cleaning and tailings system of FIG. 2.

Referring to FIGS. 2 and 3, the cleaning and tailings system 108 comprises an upper sieve 110 and a lower sieve 112 spaced from the upper sieve. A clean grain sheet 114 is disposed below the lower sieve, and a tailings sheet 116 is disposed below the clean grain sheet for receiving grain from the lower sieve and upper sieve. A tailings auger 118 is disposed about a forward end of the tailings sheet, and a sensor 120 is disposed about an inlet 122 of the tailings auger, e.g., along a front wall of the tailings auger housing 123, for sensing impact of grain received by the tailings sheet.

By disposing the sensor 120 about the inlet 122 of the tailings auger 118, the tailings are travelling at considerable rolling speed along the tailings sheet whereby the grain strikes the sensor with sufficient force in order to provide a clear and accurate signal to a controller 124, described below, of the amount of grain received by the tailings sheet and striking the sensor.

As shown in FIGS. 2-5, the upper sieve 110 is a generally planar, metal grate-like structure having openings for passage of grain and MOG onto the lower sieve 112. As shown in FIG. 2, a rear portion 126 of the upper sieve extends rearwardly of a rear portion 128 of the lower sieve 112. In order to facilitate passage of matter through upper sieve 110, the upper sieve is mounted to an upper shaker shoe frame 130 that agitates the upper sieve by moving the upper sieve in alternating fore and aft directions.

Still referring to FIGS. 2-5, the lower sieve 112 is a generally planar, metal grate-like structure having openings for passage of grain onto the clean grain sheet 114. In order to facilitate passage of matter through lower sieve 112, the lower sieve is mounted to a lower shaker shoe frame 132 that agitates the lower sieve by moving the lower sieve in alternating fore and aft directions.

As shown in FIGS. 2 and 3, the clean grain sheet 114 is a downwardly sloping metal sheet that extends from the rear portion 128 of the lower sieve 112, past the sensor 120 to a location above and between a clean grain auger 134 and the tailings auger 118. The clean grain sheet 114 receives grain passing through the lower sieve and delivers the grain to the clean grain auger. The clean grain auger transports grain via a conveyor 154 to a storage receptacle such as a hopper 156, discussed below, carried by the harvester 100.

Referring to FIGS. 2 and 3, the tailings sheet 116 is a downwardly sloping metal sheet that extends from rear portion 126 of the upper sieve to the inlet 122 of the tailings auger 118. The tailings sheet 116 receives tailings including grain and MOG that passes through the rear portion 126 of the upper sieve 110 as well as grain and MOG that fails to pass through the lower sieve 112 and falls from the rear portion 128 of the lower sieve. The grain and MOG received by the tailings sheet is delivered by the tailings sheet to the sensor 120 whereupon it impacts the sensor before falling through the inlet 122 of the tailings auger into the tailings auger.

Figure 7:
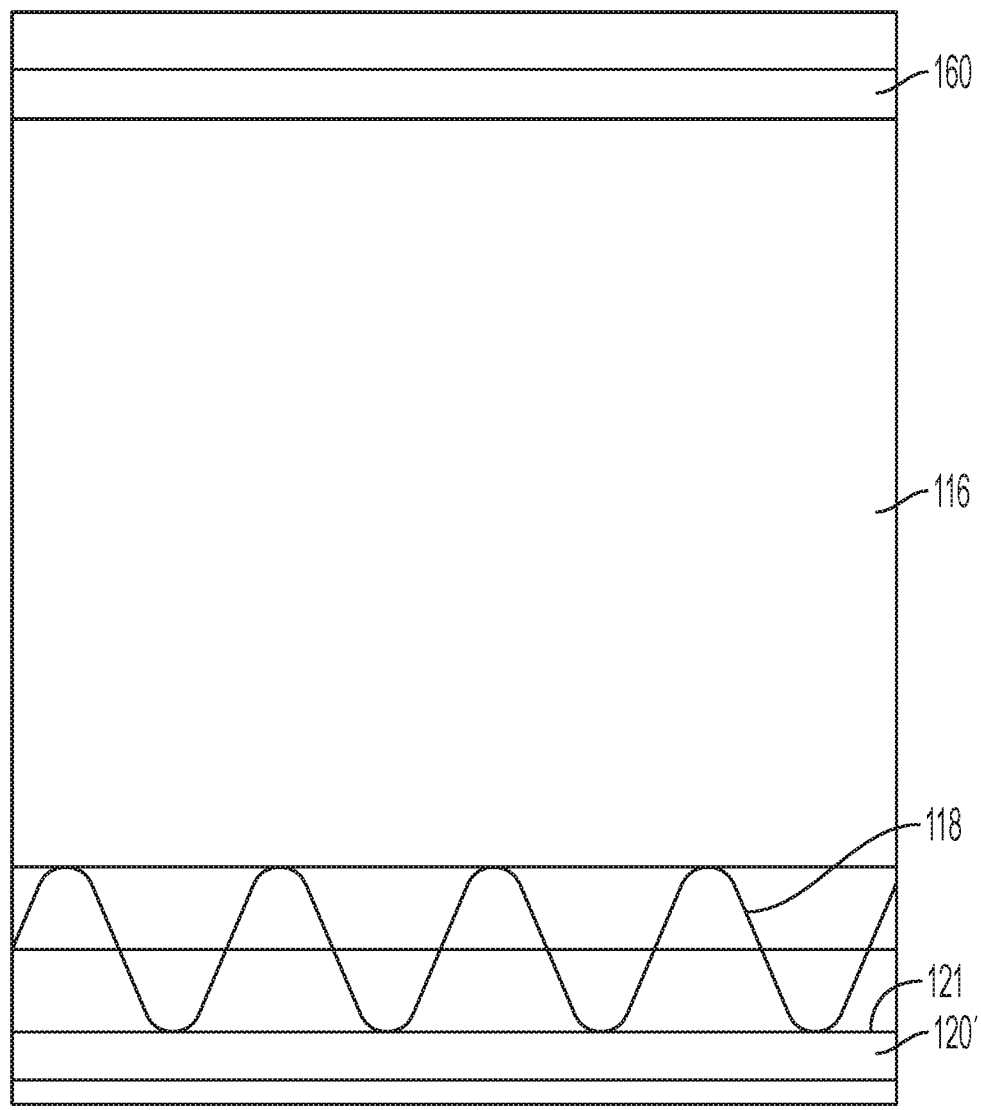
FIG. 7 is a plan view of a tailings sheet in accordance with an exemplary embodiment of the subject disclosure showing a first arrangement of grain sensors.
Figure 8:
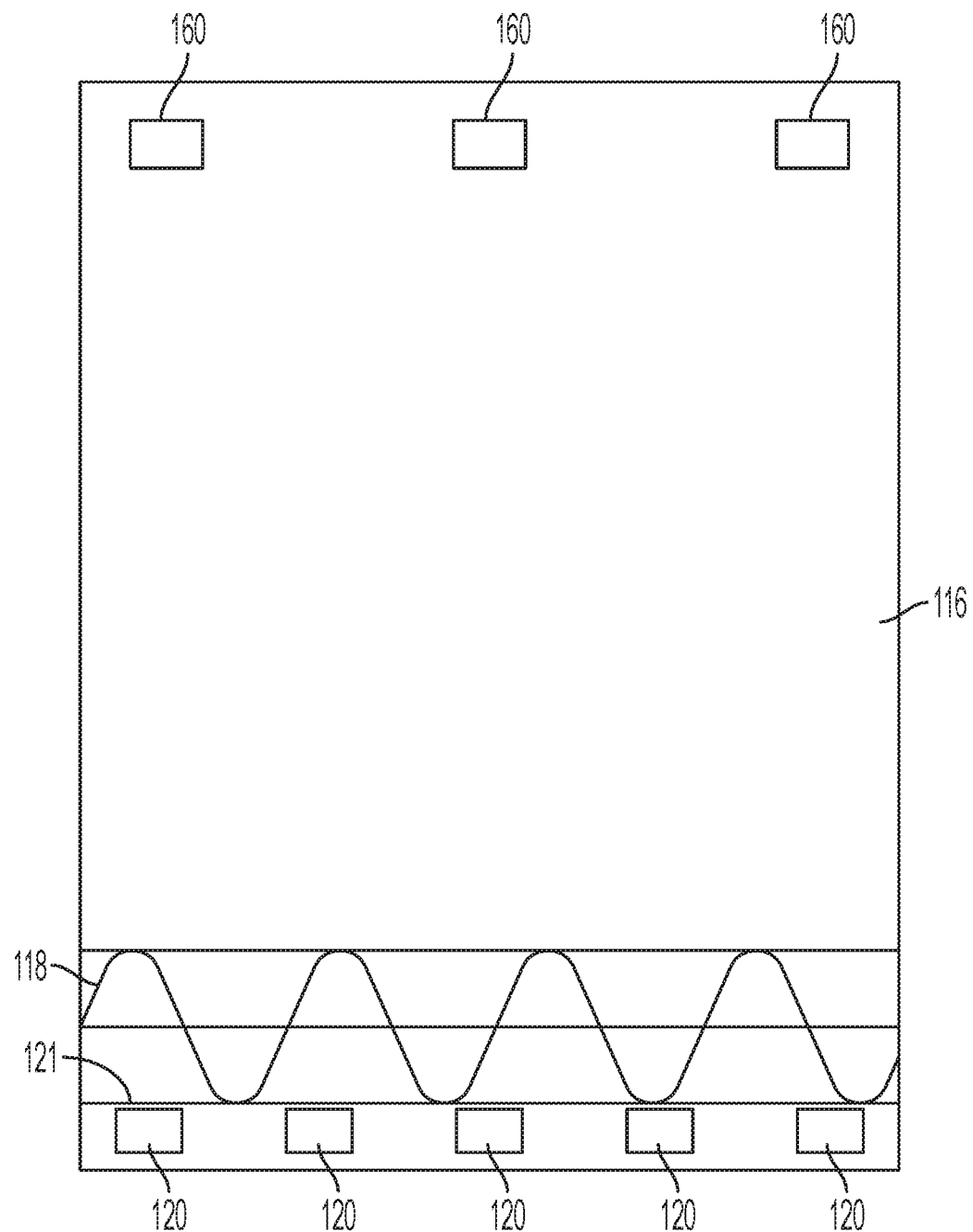
FIG. 8 is a plan view of a tailings sheet in accordance with a further exemplary embodiment of the subject disclosure showing an alternative arrangement of grain sensors.

As shown in FIGS. 7 and 8, the tailings auger 118 is an elongated screw auger substantially spanning the width of the cleaning and tailings system 108. As described below, the tailings auger operates to deliver tailings in the form of grain and MOG to a tailings housing 146 which, in turn, returns the tailings to the upper sieve 110 for further separation. Alternatively, tailings may be delivered back to the threshing rotor 136 of the threshing system.

Figure 6:
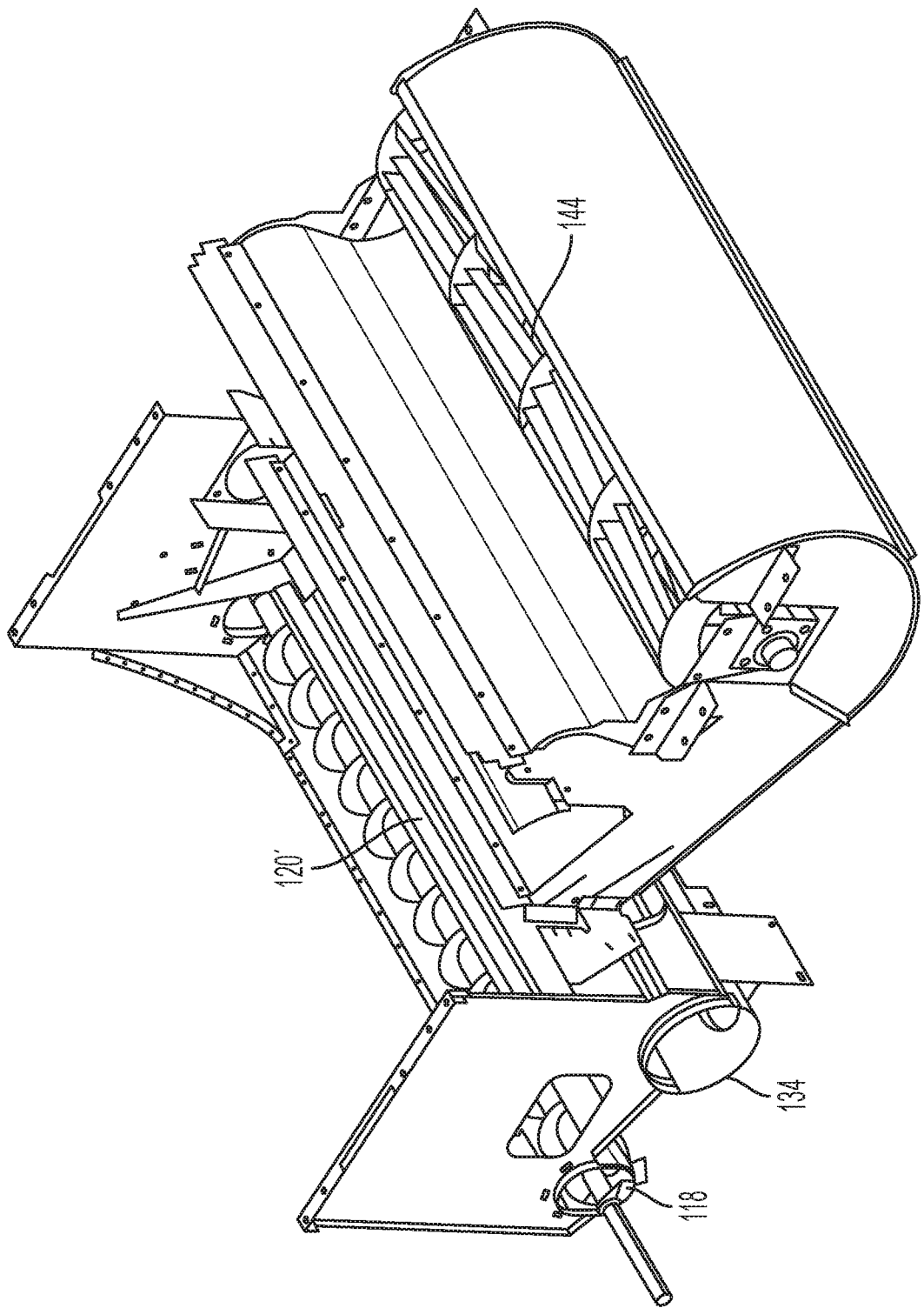
FIG. 6 is a top perspective view of a lower section of the cleaning and tailings system of FIG. 2.

The sensor 120 is an impact sensor positioned about a forward end 121 of a housing 123 of the tailings auger 118. The impact sensor can be, e.g., a piezoelectric sensor such as part numbers 47403727 and 47403728 marketed by New Holland Agriculture of Racine, Wis. The sensor 120 can extend at least a partial width of the inlet 122 of the tailings auger 118. Alternatively, as shown in FIGS. 6 and 7, the sensor 120' can extend substantially the entire width of the tailings auger. Optionally, as described below in connection with FIG. 8, a plurality of sensors 120 may be spaced apart along the width of the tailings auger. Additionally, as shown in FIGS. 2 and 3, the sensor 120 can have a height extending substantially from the tailings auger to the clean grain sheet 114 to prevent tailings from entering the clean grain auger 134.

The harvester further includes a threshing rotor 136 which receives cut crops from the feederhouse. As is known, threshing rotor 136 rotates and threshes the cut crop. In particular, larger elements of cut crop, such as stalks, leaves and the like are discharged from the threshing rotor 136 to the rear of the harvester. Smaller elements of crop material including grain and MOG (e.g., chaff, duct and straw) are discharged through perforations in the lower half of the threshing rotor 136. The grain and MOG discharged from the threshing rotor 138 is directed to fall on a grain pan 140. From the grain pan 140, the grain and MOG can be delivered to a pre-sieve 142 through which some grain and MOG passes to the lower sieve 112 and from which some grain and MOG passes to the upper sieve 110. In addition, the cleaning portion of the cleaning and tailings system 108 can include a cleaning fan 144 for blowing pressurized air toward the various sieves to facilitate separation of grain from MOG.

Some combine cleaning systems known in the art include a lateral compensation system which can counteract the effects of harvesting on side hills or the effects of uneven grain and MOG distribution. Examples include the leveling cleaning system described in U.S. Pat. No. 4,344,443 and the lateral shaking cleaning system described in U.S. Pat. No. 10,076,078, the disclosures of which are incorporated herein in the entirety for all purposes. The sensor arrangement illustrated in FIG. 8, i.e., a plurality of spaced apart sensors 120, likewise provides the capability to adjust side compensation in response to a sensed tailings distribution on the tailings sheet 116.

Figure 5:
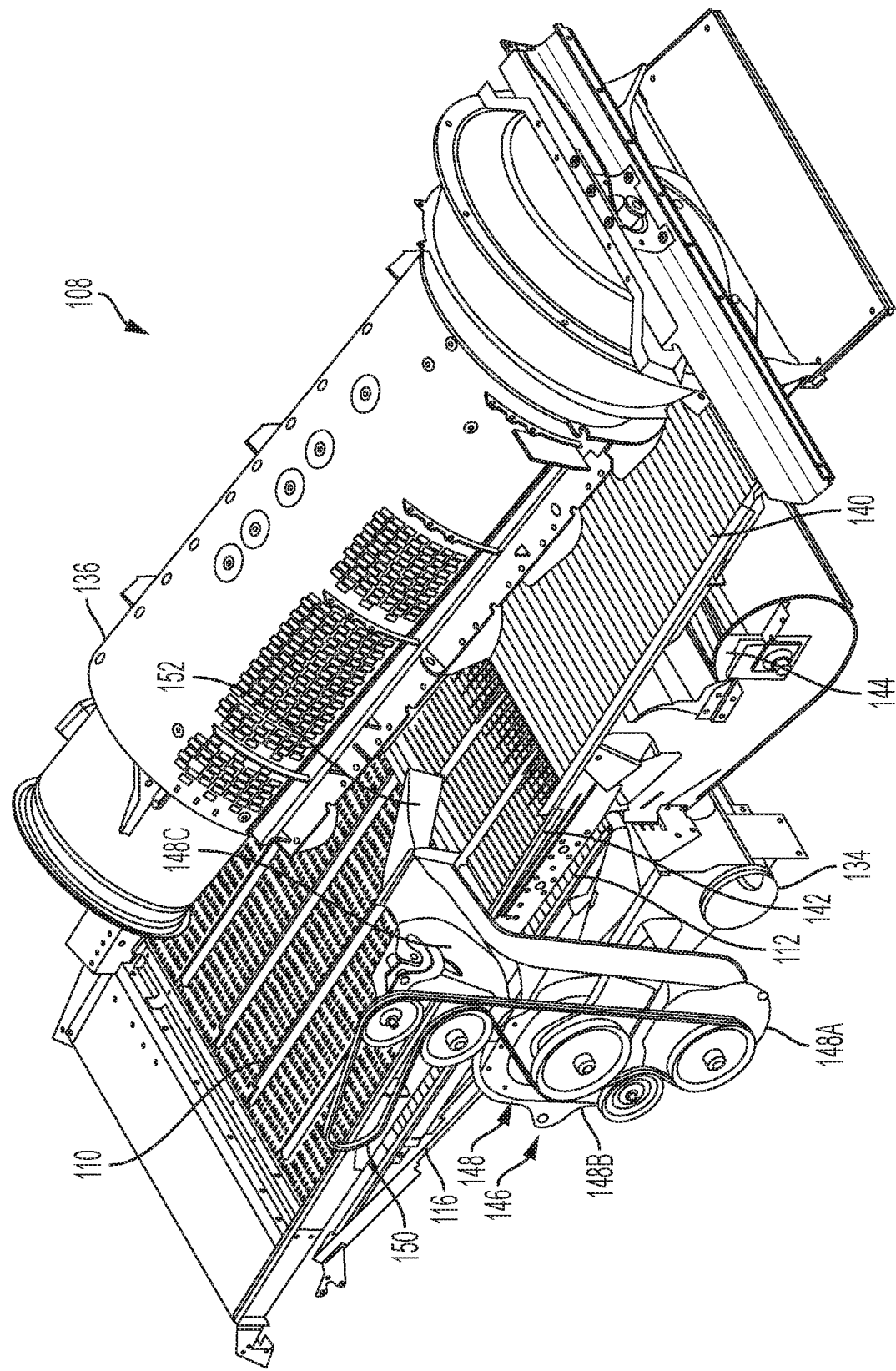
FIG. 5 is a top perspective view of an opposite side of the cleaning and tailings system of FIG. 2.

Referring to FIG. 5, the cleaning and tailings system 108 is shown to further include a tailings housing 146 the bottom of which receives tailings from the output of the tailings auger. The tailings housing 146 comprises a conveyor 148 including a plurality of elevator components 148A, 148B and 148C that are driven by an endless belt or chain 150 which is driven by an unillustrated power take off from the motor of the agricultural harvester 100 or from an unillustrated hydraulic, pneumatic or electric motor carried by the harvester. The conveyor conveys grain and MOG received in the tailings auger 118 to the upper sieve 110 through a shoot 152 for further processing by the cleaning and tailings system 108.

In addition, as shown in FIG. 1, the grain handling system includes a conveyor 154 for delivering clean grain from the clean grain auger 134 to a hopper 156 carried by the agricultural harvester 100. From the hopper 156, clean grain may be delivered by a clean grain conveyor 158 to a receiving vehicle such as a truck or the like or to a clean grain delivery station.

Referring back to FIGS. 2 and 3, the cleaning and tailings system 108 may additionally include at least one second sensor 160 positioned about a rear end of the tailings sheet 116 and in communication with the sensor 120. The second sensor 160 provides an initial input of data, e.g., impact data, regarding grain contacting the tailings sheet.

Referring to FIGS. 2 and 3, the controller 124 is in communication with the sensor 120. The controller is configured to determine an amount of grain received by the tailings sheet 116. The controller may also be in communication with the sensor 160. The controller 124 is configured to determine an amount of grain received by the tailings sheet in real time, e.g., by determining a number of grain impacts per square feet per second on the sensor 120 and the sensor 160.

Referring to FIG. 1, the agricultural combine 100 comprises a cab 162 having a monitor 164 in communication with the controller 124 for displaying an amount of grain received by the tailings sheet 116. According to an aspect, the monitor 164 displays the amount of grain received by the tailings sheet in real time, e.g., via a graphical representation of an estimated amount of grain received based on data received at least from the sensor 120.

Referring to FIG. 7, there is shown a first exemplary arrangement of grain sensors on the tailings sheet 116. More particularly, each of sensors 120' and 160 is a single sensor substantially spanning the width of the tailings sheet 116. Sensor 120' is positioned about a forward end 121 of the tailings auger 118 and sensor 160 is positioned at a rear end of the tailings sheet. In contrast, FIG. 8 shows a plurality of discrete sensors 120 spaced along the forward end 121 of the tailings auger 118. Similarly, a plurality of discrete sensors 160 are spaced along the rear end of the tailings sheet. It will be understood that the number of sensors 120 and 160 may vary from that shown in FIG. 8. Moreover, a single sensor 120' substantially spanning the width of the tailings sheet 116 may be used in conjunction with zero, one or more sensors 160 positioned at a rear end of the tailings sheet. Likewise, a single sensor 160 substantially spanning the width of the rear of the tailings sheet 116 may be used in conjunction with one or more sensors 120 positioned about a forward end 121 of the tailings auger 118.

In accordance with the subject disclosure there is provided a method for monitoring grain content within the cleaning and tailings system 108 of an agricultural harvester 100 having an upper sieve 110, a lower sieve 112 spaced from the upper sieve, a clean grain sheet 114 situated below the lower sieve, a tailings sheet 116 situated below the clean grain sheet, and a tailings auger 118 situated about a forward end of the tailings sheet. The method comprises disposing a sensor 120 about an inlet 122 of the tailings auger 118 to sense impact of grain received by the tailings sheet 116. The method further comprises using the controller 124 in communication with the sensor 120, and determining an amount of grain received by the tailings sheet 116. The step of determining can comprise determining the amount of grain received by the tailings sheet 116 in real time.

The method can further comprise providing a second sensor 160 positioned about a rear end of the tailings sheet 116 and in communication with the first sensor 120.

Additionally, the method can further comprise providing a monitor 164 to display an amount of grain received by the tailings sheet 116. The step of displaying comprises displaying on the monitor an amount of grain received by the tailings sheet in real time.

Additionally, the method can utilize a plurality of sensors 120 and the controller 124 to affect the behavior of a lateral compensation system of a cleaning portion of the cleaning and tailings system 108 in response to s sensed lateral distribution of grain in the tailings.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A cleaning and tailings system of an agricultural harvester comprising:
   an upper sieve;
   a lower sieve spaced from the upper sieve;
   a clean grain sheet below the lower sieve;
   a tailings sheet below the clean grain sheet for receiving grain from the lower sieve and upper sieve;
   a tailings auger about a forward end of the tailings sheet; and
   a sensor disposed between the tailings auger and the tailings sheet for sensing grain received by the tailings sheet.

2. The cleaning and tailings system of claim 1, wherein the sensor is an impact sensor.

3. The cleaning and tailings system of claim 1, wherein the sensor is positioned above the tailings auger.

4. The cleaning and tailings system of claim 1, wherein the sensor extends substantially an entire width of the tailings auger.

5. The cleaning and tailings system of claim 1, wherein the sensor comprises a plurality of sensors spaced apart along a width of the tailings auger.

6. The cleaning and tailings system of claim 1, wherein the sensor extends substantially from the tailings auger to the clean grain sheet.

7. The cleaning and tailings system of claim 1, further comprising a second sensor positioned about a rear end of the tailings sheet and in communication with the first sensor.

8. The cleaning and tailings system of claim 1, further comprising a conveyor for conveying grain and material other than grain received in the tailings auger to the upper sieve.

9. An agricultural combine comprising:
   the cleaning and tailings system of claim 1, and
   a controller in communication with the sensor, wherein the controller is configured to determine an amount of grain received by the tailings sheet.

10. The agricultural combine of claim 9, further comprising a cab having a monitor for displaying an amount of grain received by the tailings sheet in real time.

11. The cleaning and tailings system of claim 1, wherein the sensor is positioned below the tailings sheet.

12. The cleaning and tailings system of claim 1, wherein the sensor is positioned anteriorly spaced from an inlet of the tailings auger.

13. A method for monitoring grain content within the cleaning and tailings system of an agricultural harvester having an upper sieve, a lower sieve spaced from the upper sieve, a clean grain sheet situated below the lower sieve, a tailings sheet situated below the clean grain sheet, and a tailings auger situated about a forward end of the tailings sheet, comprising the steps of:
   using a sensor positioned between the tailings auger and the tailings sheet, sensing grain received by the tailings sheet; and
   using a controller in communication with the sensor, determining an amount of grain received by the tailings sheet based on data from the sensor.

14. The method of claim 13, wherein the step of determining determines the amount of grain received by the tailings sheet in real time.

15. The method of claim 13, further comprising using a second sensor positioned about a rear end of the tailings sheet and in communication with the first sensor.

16. The method of claim 13, further comprising using a monitor to display an amount of grain received by the tailings sheet.

17. The method of claim 16, further comprising displaying on the monitor an amount of grain received by the tailings sheet in real time.

18. The method of claim 13, further comprising adjusting a lateral compensation of a cleaning portion of the cleaning and tailings system in response to a sensed tailings distribution.

* * * * *